Dec. 16, 1947.  L. S. HOBBS  2,432,664
CONTROL AUTOMATICALLY VARIABLE WITH ALTITUDE
Filed June 26, 1943    2 Sheets-Sheet 1
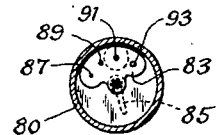
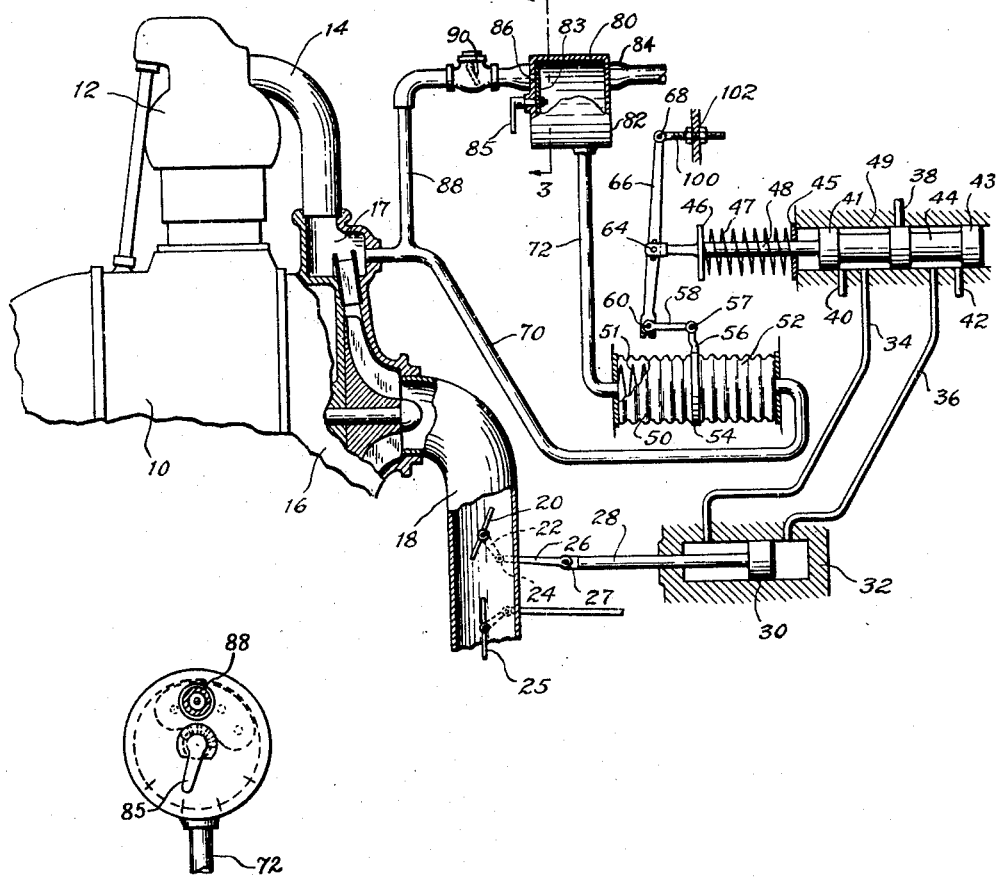
INVENTOR
*Leonard S. Hobbs*
BY *Charles L. Shelton*
ATTORNEY.

Dec. 16, 1947.        L. S. HOBBS        2,432,664
CONTROL AUTOMATICALLY VARIABLE WITH ALTITUDE
Filed June 26, 1943        2 Sheets-Sheet 2

INVENTOR
*Leonard S. Hobbs*
BY *Charles L. Shelton*
ATTORNEY.

Patented Dec. 16, 1947

2,432,664

UNITED STATES PATENT OFFICE 2,432,664

CONTROL AUTOMATICALLY VARIABLE WITH ALTITUDE

Leonard S. Hobbs, West Hartford, Conn., assignor to United Aircraft Corporation, East Hartford, Conn., a corporation of Delaware Application June 26, 1943, Serial No. 492,421

4 Claims. (Cl. 123—103)

This invention relates to an automatic control particularly adapted for regulating the charge pressure of a supercharged aircraft engine.

An object of this invention is to provide an automatic blower control which will gradually vary the blower discharge pressure according to a desired relationship with variations in the atmospheric pressure at the blower inlet.

Other objects and advantages will be apparent from the specification and claims, and from the accompanying drawing, which illustrates what is now considered to be a preferred embodiment of the invention.

In the drawings,

Fig. 1 is a schematic view of an aircraft engine provided with a supercharger and one embodiment of a control means constructed according to the present invention.

Fig. 3 is a detail view along the line 3—3 of Fig. 1.

Figure 2:
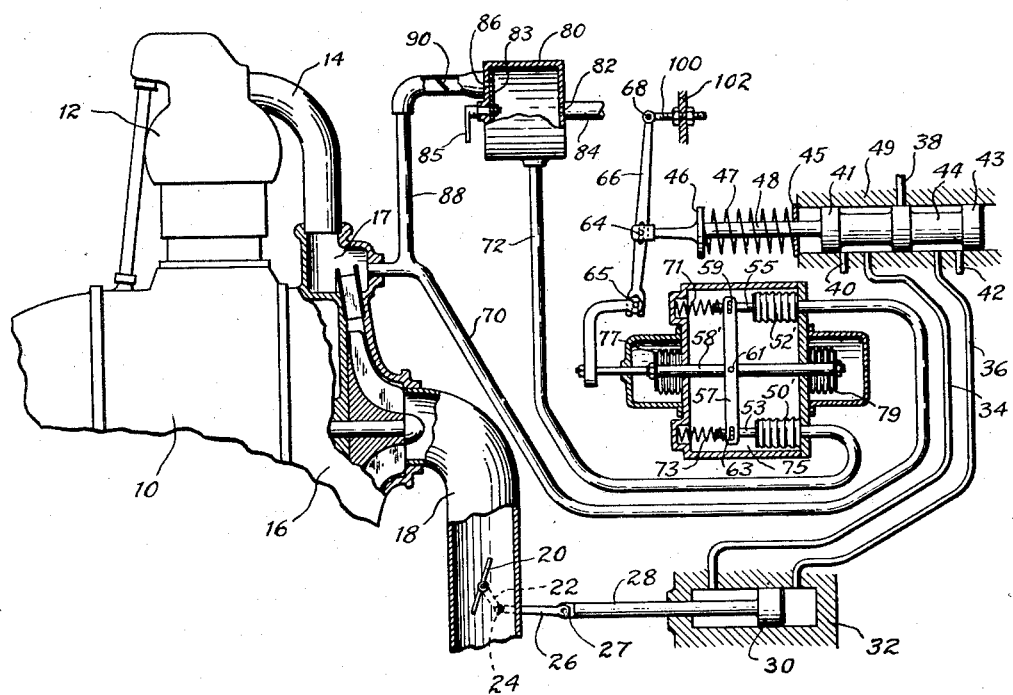
Fig. 2 is a view similar to Fig. 1, but incorporating a different embodiment of the invention.

According to the present invention, a supercharger is controlled so as to automatically vary the engine charge pressure, at full throttle, with the altitude of the aircraft. For instance, the apparatus of this invention may be adjusted to regulate the engine charge pressure so as to maintain substantially constant engine power output up to the critical altitude of the supercharger; or it may be set to smoothly and gradually increase or decrease the engine power output according to a predetermined relationship with change in altitude.

Referring to the drawings, an engine 10 having cylinders one of which is indicated at 12 is supplied with a charge through induction pipes, one of which is shown at 14. Air or a fuel-air mixture is supplied under pressure to the induction pipes by a supercharger 16 having an intake 18 in which is inserted an automatically controlled throttle valve 20. A manually controlled throttle 25 (Fig. 1) may also be provided.

Throttle valve 20 is automatically positioned by the control apparatus of this invention so as to vary the pressure that will be maintained in the cylinder induction pipes, by controlling the flow of air to the supercharger through the conduit 18. While an air intake throttle is shown in the embodiments of the drawing, it will be apparent to those skilled in the art that other means may be used to regulate the supercharger output, or the engine intake charge pressure, by the control apparatus of this invention. Thus, the control of this invention may be utilized for controlling the speed of one or more stages of a multi-stage supercharger, and thus regulating the supercharger output and the engine charge pressure. For example, the apparatus of this invention may be adapted for use with the mechanism disclosed in my copending application entitled, "Infinitely variable blower drive," U. S. application Serial No. 492,422, filed June 26, 1943, concurrently herewith; or in the Hobbs-Willgoos application entitled, "Infinite variable blower drive," U. S. application Serial No. 492,423, filed June 26, 1943, concurrently herewith.

Throttle 20 is connected through arm 22, rigid therewith, to a piston rod 28 by link 26 pivoted to the arm at 24 and to the rod at 27. Piston rod 28 is attached to servo piston 30 reciprocably mounted in cylinder 32. For reciprocating the piston and thus opening or closing throttle 20, a valve 44 acts to admit fluid, such as engine lubricating oil, from a source 38 under pressure to either conduit 34 or conduit 36 connected respectively with the servo-motor cylinder at opposite sides of piston 30. When valve 44 is shifted to the right, source 38 will be placed in communication with conduit 34 while conduit 36 will be drained through port 42. In this position, the drain port 40 is closed by the lefthand land 41 of the valve 44. Conversely, when valve 44 moves to the left, oil under pressure will be admitted to conduit 36 to force servopiston 30 to the left, during which movement oil on the lefthand side of the piston will drain through conduit 34 and port 40. Thus, it will be seen that a leftward movement of control valve 44 will cause piston 30 to move to the left in a direction to close throttle valve 20 and a rightward movement of valve 44 will cause piston 30 to move to the right in a direction to open throttle 20. Drains 40 and 42 may be restricted, if desired.

In the embodiment of Fig. 1 opposed bellows 50 and 52 are provided for shifting valve 44 to control the supercharger outlet pressure as a function of the pressure of the atmosphere surrounding the engine. Each of these bellows is fixed at one end and has its other end terminating in and closed by a common head 54, which is shiftable either to the right or to the left in response to a change in the pressure difference between the two bellows. Bellows 52 is connected to the outlet side of the supercharger 16 by a conduit 70 and bellows 50 is connected through a conduit 72 to a pressure chamber 80. This chamber is connected through an orifice 86 to the outlet side of the supercharger by conduit 88, which contains a check valve 90 therein to allow fluid to pass from the supercharger into the chamber 80 but not in a reverse direction. Chamber 80 also communicates with the atmosphere surrounding the engine through an orifice 82 and a conduit 84. Because chamber 80 is connected both with the outlet side of the supercharger as well as with the atmosphere through restricted orifices 86 and 82, it will be seen that the pressure that will be maintained therein, and consequently the pressure that will be maintained in bellows 50, will lie somewhere in the range between the supercharger outlet pressure and the atmospheric pressure at the particular aircraft altitude, and will be dependent upon the relative sizes of orifices 82 and 86. Because the pressure admitted to the chamber through conduit 84 will vary with the altitude of the aircraft, the pressure maintained in chamber 80 will also vary with the altitude of the aircraft and this pressure may be regulated to a predetermined value relative to atmospheric pressure at each aircraft altitude by properly sizing the orifices 82 and 86 relative to each other. Either or both of these orifices may be made adjustable, either for the purpose of initially facilitating the selection of the proper orifice sizes or for the purpose of varying the relative orifice sizes while the aircraft is in flight. In Fig. 3 is shown an arrangement in which the degree of restriction of orifice 86 may be altered by rotating plate 83 by handle 85 to partially blank-off orifice 86 with one of the smaller different sized orifices 87, 89, 91, 93. Ordinarily, the orifices 82 and 86 should be so sized as to provide a maximum fluid velocity therethrough which is below the critical velocity, or the velocity above which the amount of flow is not proportional to the pressure head across the orifice. However, in some instances, it may be desirable to size one or both orifices so as to attain such a critical velocity at predetermined values of either the pressure in chamber 80 or the pressure in conduit 84, so as to impose a limit or limits on the pressures that will occur in chamber 80.

Head 54 of the bellows 50 and the bellows 52 is connected by an arm 56 and a link 58 to a valve operating lever 66. Link 58 is pivoted at 57 to arm 56 and at 60 to lever 66. Lever 66, pivoted at 64 to stem 48 of valve 44, is moved about an adjustable fulcrum 68 by movements of the head 54 to shift the valve 44 in one or the other direction. Valve 44 is normally biased to its central position, in which it closes port 38, by spring 47 acting between washer 45 bearing against the valve body 49 and a disc 46 fixed to the valve stem 48, and by a spring 51 in bellows 50 acting between the fixed end of the bellows and the head 54. Thus, spring 51 urges valve 44 in one direction and spring 47 urges valve 44 in the other direction, and the valve may be biased to a closed position for a selected value of pressure difference between bellows 52 and bellows 50 by proper selection of springs 51 and 47. These springs might also be made adjustable, if desired.

As an adjusting means, the position of the fulcrum 68 may be varied by turning screw 100 in or out of the fixed support 102.

At any given aircraft altitude (or for any given value of atmospheric pressure applied to the chamber 80 by conduit 84), the pressure that will be maintained in the collector ring 17 of supercharger 16 will be held substantially constant by the action of the control mechanism. Upon an increase in the supercharger outlet pressure above the selected value, the pressure in bellows 52 will increase to move head 54 and valve 44 to the left against the action of spring 51, which will cause the servopiston to move throttle 20 in a closing direction and thus lower the inlet pressure and consequently the outlet pressure of the blower. Upon a decrease in the supercharger outlet pressure below the selected value, the pressure in conduit 70 and bellows 52 will be lowered and the spring 51 will move head 54 and the valve 44 to the right against the action of spring 47. This will cause the movement of the servopiston 30 to the right in a direction to open throttle 20 and return the supercharger outlet pressure to its regulated value. Thus, it will be seen that at any given aircraft altitude the control mechanism will operate to maintain a substantially constant intake manifold pressure, when the manually operated throttle 25 is open, which pressure may be selected by varying the relative tension of springs 51 or 47 or shifting the position of fulcrum 68.

As the aircraft ascends, the pressure maintained in chamber 80 will decrease and may be regulated by properly sizing orifices 82, 86 to decrease in any predetermined relationship with the decrease in atmospheric pressure resulting from an increase in altitude. When the pressure in chamber 80 varies, the pressure in bellows 50 also varies and causes head 54 to move in one or the other direction to vary the setting of the control device. Bellows 52 operates to maintain a substantially constant supercharger outlet pressure at a given setting of bellows 50, while the bellows 50 is automatically reset or adjusted by the action of chamber 80 as the aircraft altitude changes to infinitely vary the pressure that will be maintained in the intake manifold by bellows 52 in a predetermined relationship to the pressure of the atmosphere at the open end of conduit 84.

In the arrangement of Fig. 1 a reduction in the atmospheric pressure to which the chamber 80 is exposed will result in a decrease in the pressure in bellows 50 and will cause valve 44 to operate the servopiston 30 in a direction to close throttle 20 and thus decrease the pressure on the outlet side of the supercharger 16. Hence, as the aircraft gains in altitude, the regulated charge pressure that will be maintained in the induction pipes by the supercharger will be decreased in value by the action of the control device of Fig. 1.

As shown in Fig. 2, in which similar parts are indicated by like numerals, the bellows are arranged to provide for an increase in engine charging pressure upon a decrease in atmospheric pressure such as would be caused by an increase in aircraft altitude. Whether an increase or decrease of charging pressure is desired with increased altitude depends to a large extent upon the operating characteristics of the particular power plant with which the control is used. In this figure the regulating bellows and the altitude compensating bellows will be operated similarly to those of Fig. 1, but are allied rather than opposed in action. Regulating bellows 52' and the altitude compensating bellows 50' are preferably positioned in an evacuated chamber 75 which surrounds their exterior surfaces.

An increase in the supercharger outlet pressure will expand the bellows 52' to pivot lever 57 about fulcrum 63 by means of arm 55 fixed at one end to the head of bellows 52' and pivoted at 59 to the lever 57. This pivotal movement of lever 57 shifts rod 58' pivoted thereto at 61 to the left, which moves lever 66, having a pin and slot connection 65 with rod 58', to the left to shift the valve 44 in a direction to operate the servomotor so as to close throttle 20 and return the blower outlet pressure to its regulated valve. Conversely, a drop in the pressure in collector ring 17 will enable spring 71 to cause bellows 52' to contract, which will move lever 57 in a direction to cause the servomotor to operate in a direction to the right to open throttle 20 and thus return the pressure on the outlet side of the supercharger to the selected value. Bellows 77, 79 are provided to seal the openings where rod 58' passes through the wall of chamber 75, while at the same time allowing reciprocation of rod 58' in response to pressure changes in bellows 50' and 52'.

A reduction in the pressure in chamber 80, such as would be occasioned by an increase in aircraft altitude, will result in a decrease in the pressure in bellows 50' and cause the pivot or fulcrum 63 to move to the right, to operate valve 44 in a direction to move the servomotor piston 30 in a throttle opening direction. Thus, in the embodiment of Fig. 2, a decrease in atmospheric pressure will have the effect of resetting the control device to regulate the supercharger outlet pressure to a higher value. As the aircraft gains in altitude, the regulated pressure that will be maintained on the outlet side of the supercharger, by the control apparatus of Fig. 2, will be increased.

While only a single stage supercharger is shown in the embodiment of the drawing, it will be obvious that additional stages may be provided if desired.

It is to be understood that the invention is not limited to the specific embodiment herein illustrated and described, but may be used in other ways without departure from its spirit as defined by the following claims.

I claim:

1. In combination, an internal combustion aircraft engine, means forming a fluid passage for charging said engine, means for varying the pressure of the charging fluid in said passage, a chamber connected through restricted passages with both said passage and the atmosphere immediately surrounding said engine, and means responsive to the pressure of the fluid in said chamber and operatively connected with said charge pressure varying means for regulating the same to maintain the pressure of said charging fluid at a value determined by the pressure of the fluid in said chamber.

2. In a control device for an aircraft, a fluid passage having an atmospheric air inlet, a valve for regulating the flow of fluid through said passage, a control device responsive to variations in the pressure of the fluid passing through said passage at a point downstream of said valve for opening or closing said valve in accordance with said pressure variations, and adjustable means operatively associated with said control device and responsive to variations in atmospheric pressure adjacent said inlet for infinitely varying through a predetermined adjustable range the operation of said control device in accordance with variations in said atmospheric pressure.

3. In a charge pressure regulator for an aircraft engine, mechanism responsive to the engine charge pressure for maintaining said charge pressure at a substantially constant value determined by the pressure setting of said mechanism, a fluid pressure operated device for adjusting said mechanism to vary the pressure setting of said mechanism, means for subjecting said device to the pressure of an actuating fluid, and means for establishing in said actuating fluid a resultant pressure including an atmospheric pressure component and a charge pressure component.

4. In an aircraft engine having a supercharger, mechanism for controlling the output of said supercharger comprising, a first bellows subjected to supercharger outlet pressure, means including a second bellows opposing the action of said first named bellows, means for subjecting said second bellows to the pressure of an actuating fluid, and means for varying the pressure of said actuating fluid in accordance with variations in atmospheric pressure and with variations in supercharger outlet pressure.

LEONARD S. HOBBS.

REFERENCES CITED

The following references are of record in the file of this patent:

UNITED STATES PATENTS

| Number | Name | Date |
|---|---|---|
| 2,205,354 | Gregg et al. | June 18, 1940 |
| 2,243,627 | Gregg | May 27, 1941 |
| 2,223,381 | Mock | Dec. 3, 1940 |
| 2,283,175 | Berger | May 19, 1942 |
| 2,305,070 | Butler et al. | Dec. 15, 1942 |
| 2,233,307 | Dodson | Feb. 25, 1941 |
| 2,284,687 | Schimanek | June 2, 1942 |
| 2,233,319 | Lozivit | Feb. 25, 1941 |

FOREIGN PATENTS

| Number | Country | Date |
|---|---|---|
| 450,587 | England | 1936 |
| 537,028 | England | 1941 |
| 499,395 | England | Jan. 20, 1939 |